(12) United States Patent
Muchherla et al.

(10) Patent No.: US 11,836,392 B2
(45) Date of Patent: Dec. 5, 2023

(54) RELOCATING DATA TO LOW LATENCY MEMORY

(71) Applicant: Micron Technology, Inc., Boise, ID (US)

(72) Inventors: Kishore Kumar Muchherla, Fremont, CA (US); Ashutosh Malshe, Fremont, CA (US); Vamsi Pavan Rayaprolu, San Jose, CA (US); Sampath K. Ratnam, Boise, ID (US); Harish R. Singidi, Fremont, CA (US); Peter Feeley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/450,653

(22) Filed: Oct. 12, 2021

(65) Prior Publication Data

US 2022/0027062 A1 Jan. 27, 2022

Related U.S. Application Data

(62) Division of application No. 16/175,605, filed on Oct. 30, 2018, now Pat. No. 11,169,747.

(51) Int. Cl.
*G06F 3/06* (2006.01)

(52) U.S. Cl.
CPC .......... *G06F 3/0673* (2013.01); *G06F 3/0611* (2013.01); *G06F 3/0647* (2013.01)

(58) Field of Classification Search
CPC .... G06F 3/0604; G06F 3/0611; G06F 3/0619; G06F 3/0634; G06F 3/064; G06F 3/0646;
(Continued)

(56) References Cited

U.S. PATENT DOCUMENTS 9,330,783 B1 * 5/2016 Rotbard ............... G11C 29/025
2002/0147881 A1 10/2002 Pudipeddi et al.
(Continued)

FOREIGN PATENT DOCUMENTS

| JP | 2011186555 A | 9/2011 |
| JP | 2014517425 A | 7/2014 |
| KR | 10-2015-0130633 A | 11/2015 |

OTHER PUBLICATIONS

International Search Report and Written Opinion for International Application No. PCT/US2019/058661, dated Feb. 14, 2020, 11 pages.
(Continued)

*Primary Examiner* — Larry T Mackall
(74) *Attorney, Agent, or Firm* — Lowenstein Sandler LLP

(57) ABSTRACT

A processing device in a memory sub-system identifies a plurality of word lines at a first portion of a memory device, determines a respective error rate for each of the plurality of word lines, and determines that a first error rate of a first word line of the plurality of word lines and a second error rate of a second word line of the plurality of word lines satisfy a first threshold condition pertaining to an error rate threshold. The processing device further identifies a third word line of the plurality of word lines that is proximate to the first word line and the second word line and relocates data stored at the third word line to a second portion of the memory device, wherein the second portion of the memory device is associated with a lower read latency than the first portion of the memory device.

20 Claims, 8 Drawing Sheets

(58) Field of Classification Search
CPC .... G06F 3/0647; G06F 3/0649; G06F 3/0673; G06F 3/0679; G06F 3/068; G06F 3/0688; G06F 12/0246; G06F 2212/1024; G06F 2212/7205; G06F 2212/7208
See application file for complete search history.

(56) References Cited

U.S. PATENT DOCUMENTS

| | | |
|---|---|---|
| 2009/0193174 A1 | 7/2009 | Reid |
| 2009/0216936 A1 | 8/2009 | Chu et al. |
| 2011/0125950 A1 | 5/2011 | Haustein et al. |
| 2011/0271043 A1 | 11/2011 | Segal et al. |
| 2013/0254458 A1 | 9/2013 | Pittelko |
| 2013/0265825 A1* | 10/2013 | Lassa .................. G06F 3/0655 365/185.11 |
| 2013/0346805 A1 | 12/2013 | Sprouse |
| 2014/0281766 A1* | 9/2014 | Yang .................... G11C 11/56 714/721 |
| 2015/0193302 A1 | 7/2015 | Hyun et al. |
| 2015/0199268 A1 | 7/2015 | Davis et al. |
| 2016/0110124 A1 | 4/2016 | Camp et al. |
| 2016/0141047 A1 | 5/2016 | Sehgal et al. |
| 2016/0155516 A1 | 6/2016 | Chang et al. |
| 2016/0163393 A1* | 6/2016 | Liang .................. G06F 11/1068 365/185.11 |
| 2016/0328179 A1 | 11/2016 | Quinn |
| 2017/0075812 A1 | 3/2017 | Wu et al. |
| 2017/0262223 A1 | 9/2017 | Dalmatov et al. |
| 2018/0032275 A1 | 2/2018 | Pahwa et al. |
| 2018/0081543 A1* | 3/2018 | Muchherla ............ G06F 3/0653 |
| 2018/0129575 A1 | 5/2018 | Dallabora |
| 2018/0373460 A1 | 12/2018 | Park et al. |
| 2018/0374549 A1* | 12/2018 | Padilla ............... G11C 16/3431 |
| 2019/0317672 A1 | 10/2019 | Linnen et al. |

OTHER PUBLICATIONS

Extended European Search Report for Application No. 19877668.4, dated Jun. 21, 2022, 16 pages.
Office Action for Korean Application No. 10-2021-7015818, dated Nov. 10, 2022, 15 pages.

* cited by examiner

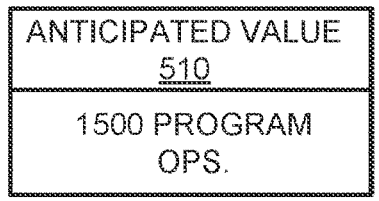
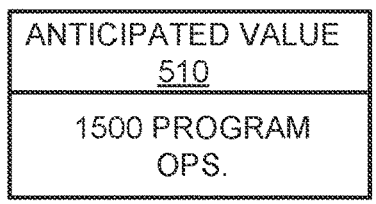
FIG. 5A
FIG. 5B

RELOCATING DATA TO LOW LATENCY MEMORY

RELATED APPLICATION

This application is a divisional of U.S. patent application Ser. No. 16/175,605, filed Oct. 30, 2018, which is herein incorporated by reference in its entirety.

TECHNICAL FIELD

Embodiments of the disclosure relate generally to memory sub-systems, and more specifically, relate to relocating data to low latency memory.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

FIG. 5A is an illustration of a memory sub-system determining to relocate subsequent data based on a number of programming operations performed on a memory component, in accordance with some embodiments of the disclosure.

FIG. 5B is an illustration of a memory sub-system determining to relocate subsequent data based on a number of programming operations performed on a memory component, in accordance with some embodiments of the disclosure.

DETAILED DESCRIPTION

Figure 1:
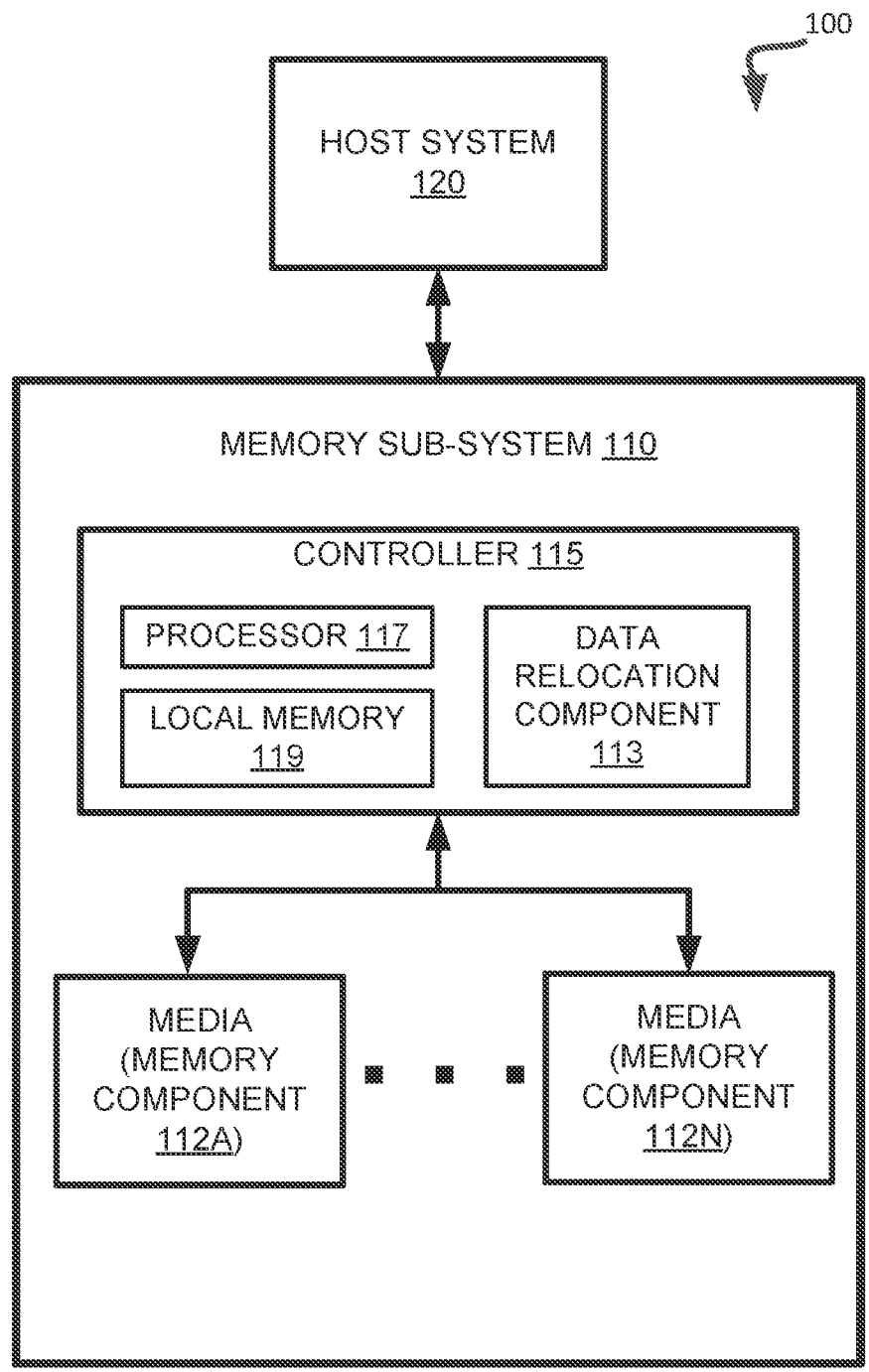
FIG. 1 illustrates an example computing environment that includes a memory sub-system in accordance with some embodiments of the present disclosure.

Aspects of the present disclosure are directed to relocating data to a low latency memory. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A memory component of a conventional memory sub-system can include memory cells that can store one or more bits of binary data corresponding to data received from the host system. For example, a memory component can include single-level cells (SLCs) that each store one bit of data, multi-level cells (MLCs) that each store two bits of data, triple-level cells (TLCs) that each store three bits of data and/or quad-level cells (QLCs) that each store four bits of data. One or more memory cells of the memory component can be grouped together to form a data block.

Each type of memory cell (e.g., SLCs, MLCs, TLCs and QLCs) can exhibit different characteristics and advantages. For example, an SLC can have a lower read latency (e.g., how long it takes for data stored at the SLC to be read), a faster programming time (e.g., how long it takes to program data received from the host system to the cell for storage) and a greater reliability for data stored at the SLC than the other types of memory cells. However, since each SLC only stores a single bit of data, a memory component including SLCs will have a lower storage capacity when compared to a memory component having the same total number of memory cells, but including at least some MLCs, TLCs and/or QLCs, which store multiple bits of data per memory cell.

In another example, a QLC stores four bits of data per memory cell, but can have a higher read latency, a slower programming time and a lower reliability for data stored at the QLC than the other types of memory cells. A memory component including QLCs will have a higher storage capacity when compared to a memory component including only SLCs, MLCs and TLCs, but the amount of time to read and write data to the memory component including QLCs will be greater than a memory component including other types of memory cells. For example, an average read time for a QLC can be approximately 200 milliseconds (ms), while the average read time for an SLC can be approximately 50 ms. Furthermore, the reliability for data stored at the memory component including QLCs can be lower than a memory component including other types of memory cells.

Accordingly, to minimize the amount of time for data received from a host system to be programmed to the memory component, a conventional memory sub-system can include a first portion of a memory component that includes QLCs and a second portion of the memory component that includes SLCs. When data is received from a host system for storage by the memory sub-system, the memory sub-system can initially program the data to the second portion of the memory component that includes SLCs, which have a faster programming speed. Once the conventional memory sub-system is idle (e.g., is not receiving instructions from the host system), the memory sub-system relocates the data stored at the second portion including SLCs to the first portion including QLCs, which have a higher storage capacity than the SLCs. The conventional memory sub-system may perform this process, also known as SLC caching, when new data is received from the host system for storage by the memory sub-system. The process provides the benefits of the faster programming speed of SLCs while also utilizing the higher storage capacity of QLCs.

However, when a host system requests the data stored at the conventional memory sub-system, the data that has been relocated needs to be read from the QLCs. As previously discussed, QLCs have a higher read latency than other types of memory cells. Reading the data from the QLCs of the memory component results in the data taking a longer time to be provided to the host system than if the data were stored at SLCs of the memory component, decreasing the performance of the memory sub-system.

Aspects of the present disclosure address the above and other deficiencies by relocating frequently read data stored at a memory component to a low latency portion of the memory component. In one embodiment, read counts for data blocks storing user data in a first portion (also referred to as "high latency portion" hereafter) of a memory component (e.g., a portion of the memory component using MLCs, TLCs and/or QLCs) are tracked and maintained by the memory sub-system. In embodiments, the memory sub-system can utilize the read counts to identify one or more data blocks that are more frequently read than other data blocks in the first portion of the memory component. In some embodiments, the memory sub-system can use error rates of word lines of a memory component to identify one or more proximate word lines that are more frequently read than other word lines of the memory component. Upon identifying the one or more data blocks, the memory sub-system can determine if there is an amount of unused storage in a second portion (also referred to as "low latency portion" hereafter) of the memory component that includes the SLCs to store data stored at the one or more identified data blocks. If the memory sub-system determines that there is sufficient storage space, the memory sub-system relocates data stored at the one or more identified data blocks to one or more data blocks in the low latency portion of the memory component that includes the SLCs.

Advantages of the present disclosure include, but are not limited to, a reduced read latency for frequently read data that is relocated to the low latency portion of the memory component. The reduced read latency results in a host system receiving the frequently read data in a shorter amount of time and an improvement in the performance of the memory sub-system. Furthermore, as previously discussed, memory cells in the low latency portion of the memory component, such as SLCs, have a greater reliability for storing data in comparison to memory cells having a higher storage density, such as QLCs. By storing frequently read data in memory cells that have a greater reliability for storing data, the number of error correction operations performed by the memory sub-system is reduced, allowing the memory sub-system to perform other operations (e.g., read and/or write operations) and improving the performance of the memory sub-system.

For illustrative purposes, aspects of the disclosure are described using a first portion of a memory component having QLCs and a second portion of the memory component having SLCs. In some embodiments, however, the memory component can have any number of portions that include any types of memory cells.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a data relocation component 113 that can be used to relocate frequently read data to a low latency portion of a memory component. In some embodiments, the controller 115 includes at least a portion of the data relocation component 113. For example, the controller 115 can include a processor 117 (processing device) configured to execute instructions stored in local memory 119 for performing the operations described herein. In some embodiments, the data relocation component 113 is part of the host system 120, an application, or an operating system.

The data relocation component 113 can identify a first data block in a first portion of a memory component that is frequently read based on either a read count associated with the first data block or error rates for word lines of the memory component. Upon identifying a frequently read data block, the data relocation component 113 can determine whether a second portion of the memory component (e.g., a portion using SLCs) has sufficient space to store data stored at the first data block. If there is sufficient space in the second portion, the data relocation component 113 can further relocate data stored at the first data block to a second data block in the second portion of the memory component. Further details with regards to the operations of the data relocation component 113 are described below.

Figure 2:
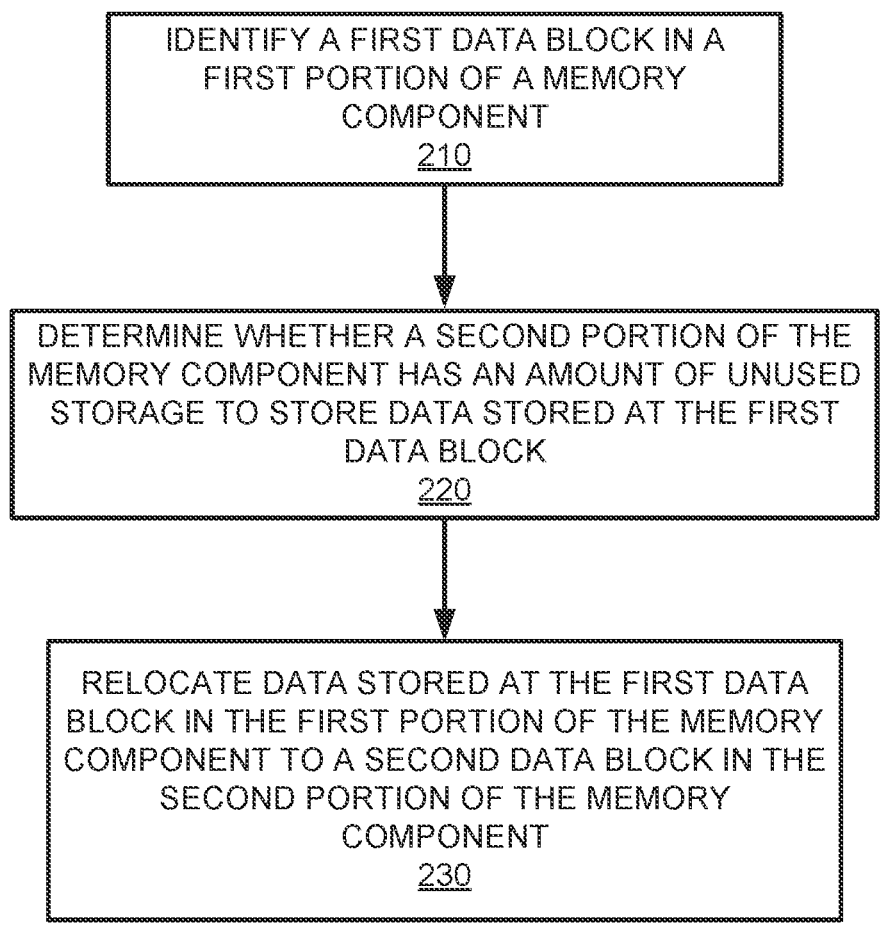
FIG. 2 is a flow diagram of an example method to relocate frequently read data to a low latency portion of a memory component based on a read count associated with the data, in accordance with some embodiments of the present disclosure.

FIG. 2 is a flow diagram of an example method 200 to relocate frequently read data to a low latency portion of a memory component based on a read count associated with the data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the data relocation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, the processing logic identifies a first data block in a first portion (e.g., high latency portion) of a memory component. The first data block is identified based on a read count associated with the first data block meeting or exceeding a read count threshold. In one embodiment, controller 115 maintains a counter for each data block on memory components 112A-112N that is incremented each time a read operation is performed on the corresponding data block. The counter may be periodically reset (e.g., when the data stored at that data block is relocated). Thus, the read count can be the current value of the counter for the first data block and can represent a number of read operations performed on the first data block. In embodiments, the read count threshold can be based on a deviation (e.g., a difference) of the read count associated with the first data block with respect to a representative read count for other data blocks of the memory component. The representative read count can correspond to the average read count for the other data blocks, the highest read count for the other data blocks, the median of the read counts for the other data blocks or any other statistical representation of the read count for the other data blocks of the memory component. The read count threshold can be a number of read operations performed on the first data block above the average read count for data blocks of the memory component. For example, if the read threshold is 500 read operations above the average read count, the average read count for data blocks of the memory component is 1,000 read operations and the read count for the first data block is 1,500 read operations, then the read count associated with the first data block meets the read count threshold.

In an embodiment, the read count threshold can correspond to a number of read operations performed on the first data block. For example, if the read count threshold is 1,000 read operations performed on the first data block and 1,000 read operations have been performed on the first data block, then the read count associated with first data block meets the read threshold. In some embodiments, the read count threshold can correspond to a difference between the read count of the first data block and the next highest read count of a data block of the memory component. For example, if the read count threshold corresponds to a difference of 500 read operations and 1,000 read operations have been performed on the first data block and the next highest read count of a data block is 500 read operations, then the read count associated with the first data block meets the read count threshold.

In embodiments, the first data block can be identified in response to a triggering condition. In some embodiments, the triggering condition can be an amount of data written to the memory component exceeding a data threshold. For example, if 1 gigabyte (GB) of data has been written to the memory component and the data threshold is 1 GB, then the amount of data written to the memory component meets or exceeds the data threshold. In an embodiment, the triggering condition can be an amount of time elapsed since data on the memory component was previously relocated or since data relocation component 113 checked the read count values of the data blocks on the memory component, as described above at block 210. For example, if 48 hours has elapsed since the previous relocation of other data to the low latency portion, then the first data block can be identified.

In embodiments, the threshold associated with the triggering condition can be adjusted so that data is relocated from the first portion to the second portion more often. For example, the data threshold can be adjusted from 1 GB of data being written to the memory component to 500 MB, causing data to be relocated from the first portion to the second portion more frequently.

In an embodiment, the threshold associated with the triggering condition can be adjusted based on a number of programming operations performed being above or below an anticipated value. As data is programmed (e.g., written) to a memory cell, the condition of the memory cell deteriorates. Accordingly, each memory cell of a memory component can have a finite number of programming operations performed on the memory cell before the memory cell can no longer reliably store data. Since relocating data from the first portion to the second portion involves the process of writing the data to memory cells at the second portion of the memory component, if a memory component has a high number of programming operations performed on the memory component, then the threshold can be adjusted so data is relocated less often. Relocating the data less often can reduce the number of programming operations performed on the memory component and prevent premature failure of the memory component.

At block 220, the processing logic determines whether a second portion of the memory component has an amount of unused storage to store data stored at the first data block. In embodiments, the processing logic can determine that the second portion of the memory component has the amount of unused storage to store the data stored at the first data block if there is sufficient unused storage to store the data stored at the first data block. For example, if the data stored at the first data block requires 5 MB of storage space and the amount of unused storage space in the second portion is 5 MB, then the second portion has the amount of storage to store the data stored at the first data block. In some embodiments, the processing logic can determine that the second portion of the memory block has an amount of storage to store the data if an amount of unused storage (e.g., memory not currently storing data) meets or exceeds a storage threshold.

The second portion of the memory component can be associated with a lower read latency than the first portion. For example, the first portion can include QLCs and the second portion can include SLCs, which have a lower read latency than the QLCs in the first portion. In some embodiments, if there is insufficient space to store the data stored at the first data block, the processing logic can determine to not relocate the data stored at the first data block in the first portion.

In embodiments, the number of data blocks in the first portion and second portion of the memory component can be static numbers of data blocks. For example, if a memory component includes 1,000 data blocks, 950 data blocks can be assigned to the first portion of the memory component and programmed as QLCs and 50 data blocks can be assigned to the second portion of the memory component and programmed as SLCs. In this example, the processing logic can determine whether there is an amount of unused storage to store the data stored at the first data block if the amount of unused storage in the second portion of the memory component meets or exceeds a storage threshold. For example, if the storage threshold is 100 MB of unused storage and 200 MB of storage in the second portion is unused, then the processing logic determines there is an amount of unused storage in the second portion to store the data stored at the first data block.

In some embodiments, the number of data blocks in the first portion and the second portion can be dynamically adjusted. In an embodiment, if there is insufficient space in the second portion to store the data stored at the first data block, the processing logic can determine if the amount of unused space (e.g., data blocks not currently storing data) in the first portion of the memory component meets or exceeds a utilization threshold. If the amount of unused space meets or exceeds the utilization threshold, the processing logic can assign one or more data blocks from the first portion to the second portion. For example, if the utilization threshold is 400 unused data blocks and the first portion has 450 unused data blocks, then the processing logic can assign one or more data blocks from the first portion to the second portion. In an embodiment, the processing logic can assign a number of data blocks needed to store the relocated data. In embodiments, the processing logic can assign a number of blocks that is greater than the number of data blocks needed to store the relocated data. In embodiments, upon assigning the one or more data blocks to the second portion, memory cells of the one or more data blocks can be programmed as SLCs rather than as QLCs.

At block 230, in response to determining that the second portion of the memory component has sufficient space, the processing logic relocates data stored at the first data block in the first portion of the memory component to a second data block in the second portion of the memory component. The process of relocating the data stored at the first data block can include reading the data stored at the first data block and programming the data to the second data block in the second portion of the memory component. In one embodiment, the processing logic updates a logical to physical table map to reflect the new location of the data in the second data block in the second portion of the memory component. The data at the first data block is invalidated, such that when a garbage collection operation is performed, that data can be erased, thereby allowing the first data block to be programmed with new data.

Figure 3:
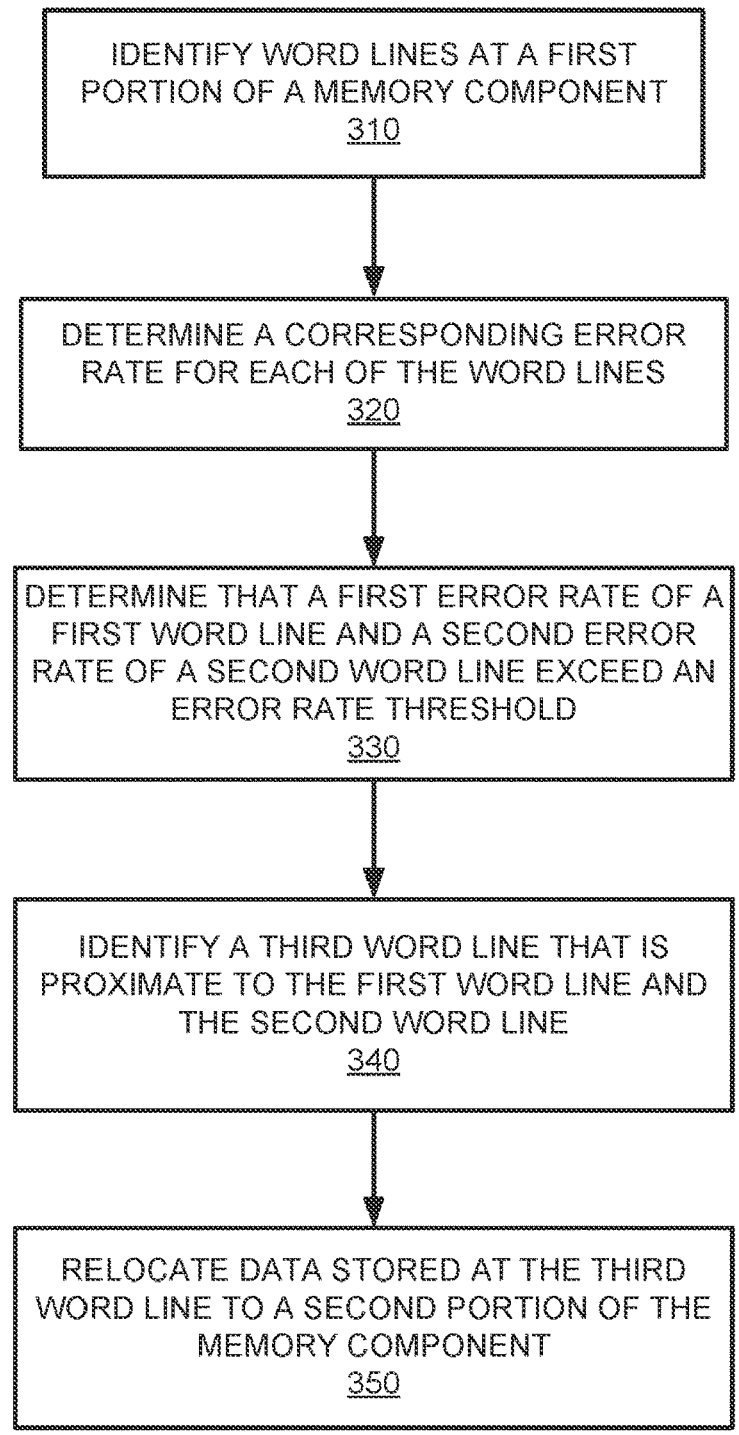
FIG. 3 is a flow diagram of an example method to relocate data stored at a word line that is proximate to word lines having error rates that exceed an error rate threshold, in accordance with some embodiments of the present disclosure.

FIG. 3 is a flow diagram of an example method 300 to relocate data stored at a word line that is proximate to word lines having error rates that exceed an error rate threshold, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the data relocation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 310, the processing logic identifies word lines at a first portion of a memory component. In embodiments, the identified word lines can include memory cells in the first portion of the memory component that are QLCs. At block 320, the processing logic determines a corresponding error rate for each of the word lines. In embodiments, the error rate can be a raw bit error rate (RBER) that corresponds to the number of bit errors per unit of time for data stored at a word line. Data is typically encoded by a System Error Correction Unit (ECU) before writing the data to a memory component. After the data is read from the memory component, the System ECU decodes the data. In embodiments, the processing logic can compare the raw data input to the ECU decoder and the corrected data output by the ECU to measure the number of bit toggles (i.e., the number of bits that have flipped from one logical value to another). This number of bit flips in between the raw data and ECU decoded data represents the error rate.

At block 330, the processing logic determines that a first error rate of a first word line and a second error rate of a second word line exceed an error rate threshold. In embodiments, the error rate threshold can be based on a deviation of the error rate associated with the first word line and second word line with respect to a representative error rate for other word lines of the memory component. The error rate threshold can be a difference between the error rates of the first and second word lines and the average error rate for word lines of the memory component. In embodiments, the error rate threshold can be a multiple of the average error rate for word lines of the memory component. For example, the error rate threshold can correspond to an error rate that is 10 times greater than the average error rate for word lines of the memory component. Further detail with regards to determining the first error rate and second error rate exceed the error rate threshold is discussed below at FIG. 6.

In an embodiment, the error rate threshold can correspond to the error rates for the first and second word lines. For example, if the error rates for the first and second word lines are $1\times10^{-4}$ and the error rate threshold is $1\times10^{-4}$, then the error rates associated with first and second word lines exceed the error rate threshold. In some embodiments, the error rate threshold can correspond to a difference between the error rates of the first and second word lines and the next highest error rate of a word line of the memory component.

Figure 6:
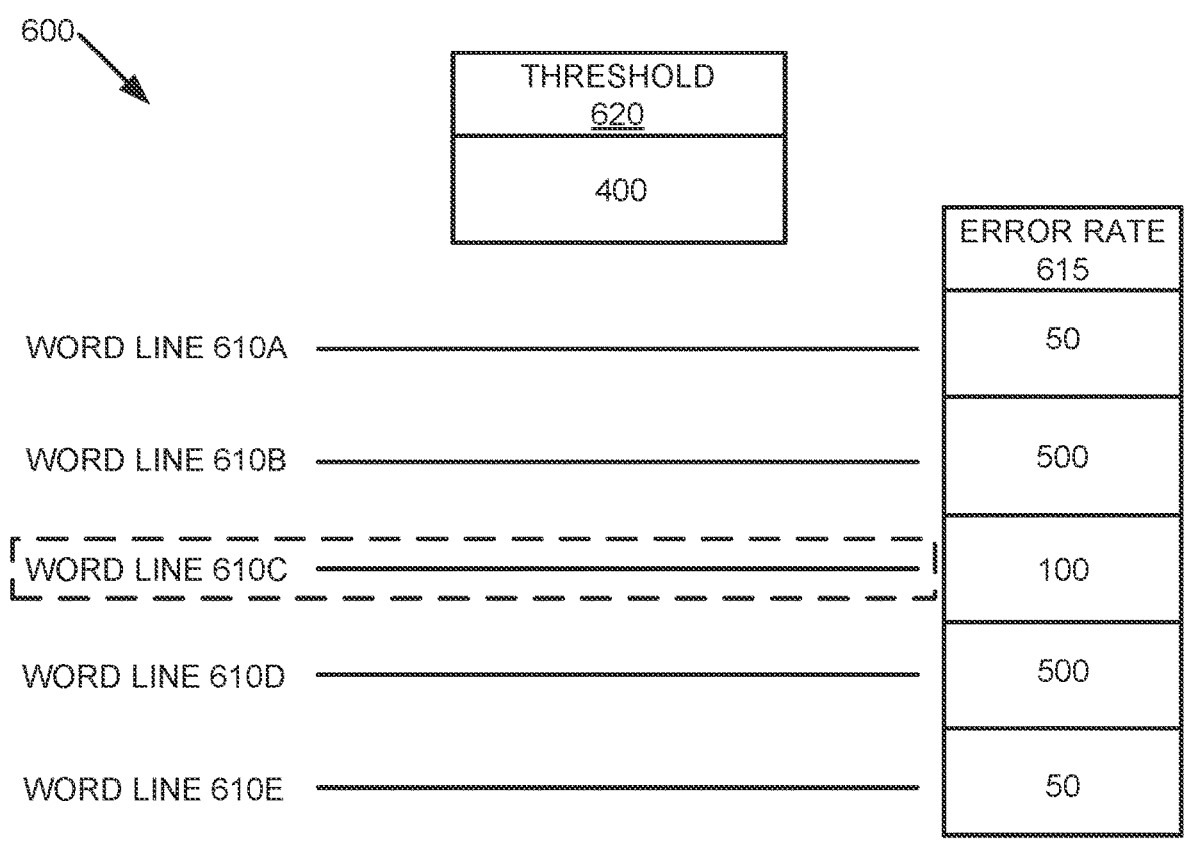
FIG. 6 is an illustration of a memory sub-system identifying a word line for relocation based on an error rate exceeding a threshold, in accordance with an embodiment of the disclosure.

At block 340, the processing logic identifies a third word line that is proximate (e.g., adjacent) to the first word line and the second word line. For example, the third word line 610C may be located between the first word line 610B and the second word line 610D, as shown in FIG. 6. When data is read from a memory cell on a word line of a memory component, memory cells on proximate word lines can experience read disturb stress. Read disturb stress can cause the memory cells on the proximate word lines to become re-programmed, resulting in a higher error rate for data stored at the proximate word lines. Therefore, word lines having an elevated error rate can serve as indicators for which word lines of a memory component have been read from most frequently. Additional detail regarding identifying a proximate word line will be discussed below at FIG. 6.

At block 350, the processing logic relocates data stored at the third word line to a second portion of the memory component. The second portion of the memory component can have a lower read latency than the first portion of the memory component.

Referring to FIG. 3, by utilizing error rates of word lines to identify frequently read word lines, the memory sub-system no longer tracks the read counts of data blocks of the memory component, as previously described in FIG. 2. Since the read counts performed on the data blocks of the memory component are no longer tracked, the amount of computing resources of the memory sub-system dedicated to tracking the read counts can be reduced or eliminated. This results in an increase in the performance of the memory sub-system.

Figure 4A:
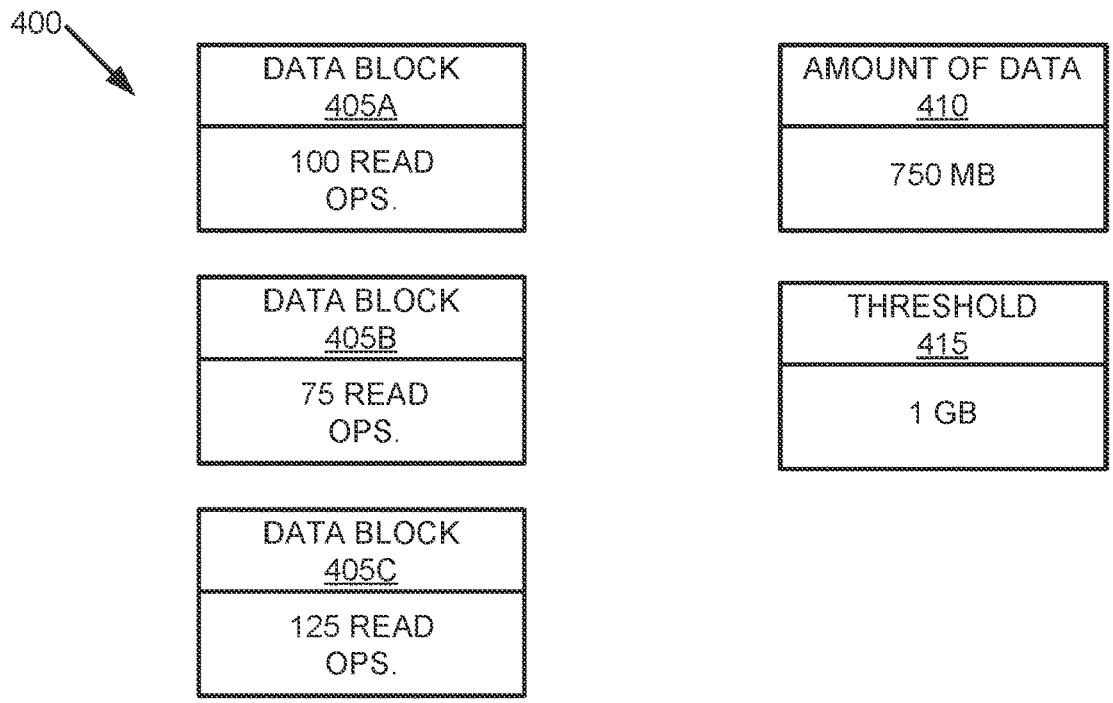
FIG. 4A is an illustration of a memory sub-system determining whether an amount of data written to a memory component meets or exceeds a data threshold, in accordance with embodiments of the disclosure.

FIG. 4A is an illustration of a memory sub-system 400 determining whether an amount of data written to a memory component satisfies a first threshold condition (e.g., meets or exceeds a data threshold), in accordance with embodiments of the disclosure. The memory component of memory sub-system 400 includes data blocks 405A, 405B and 405C that each store one or more bits of data. The memory sub-system can track the read count (e.g., READ OPS.) for each of data blocks 405A, 405B and 405C. The read counts can correspond to the number of read operations performed on data blocks 405A, 405B and 405C. Memory sub-system 400 also includes an amount of data 410 that corresponds to the amount of data 410 written to the memory component and a threshold 415 that corresponds to the data threshold as previously discussed at FIG. 2.

As previously described, in embodiments, data stored at a data block can be relocated to a low latency portion in response to a triggering condition, such as an amount of data written to a memory component satisfying the first threshold condition (e.g., exceeding a data threshold). Referring to FIG. 4A, data block 405A has a read count of 100 read operations, data block 405B has a read count of 75 read operations and data block 405C has a read count of 125 read operations. The data threshold 415 for the amount of data written to the memory component is 1 GB and the amount of data 410 written to the memory component is 750 MB. Since the amount of data 410 written to the memory component does not satisfy the first threshold condition (e.g., does not exceed the data threshold 415), the memory sub-system 400 determines to not identify a data block for relocation to the low latency portion of the memory component.

Figure 4B:
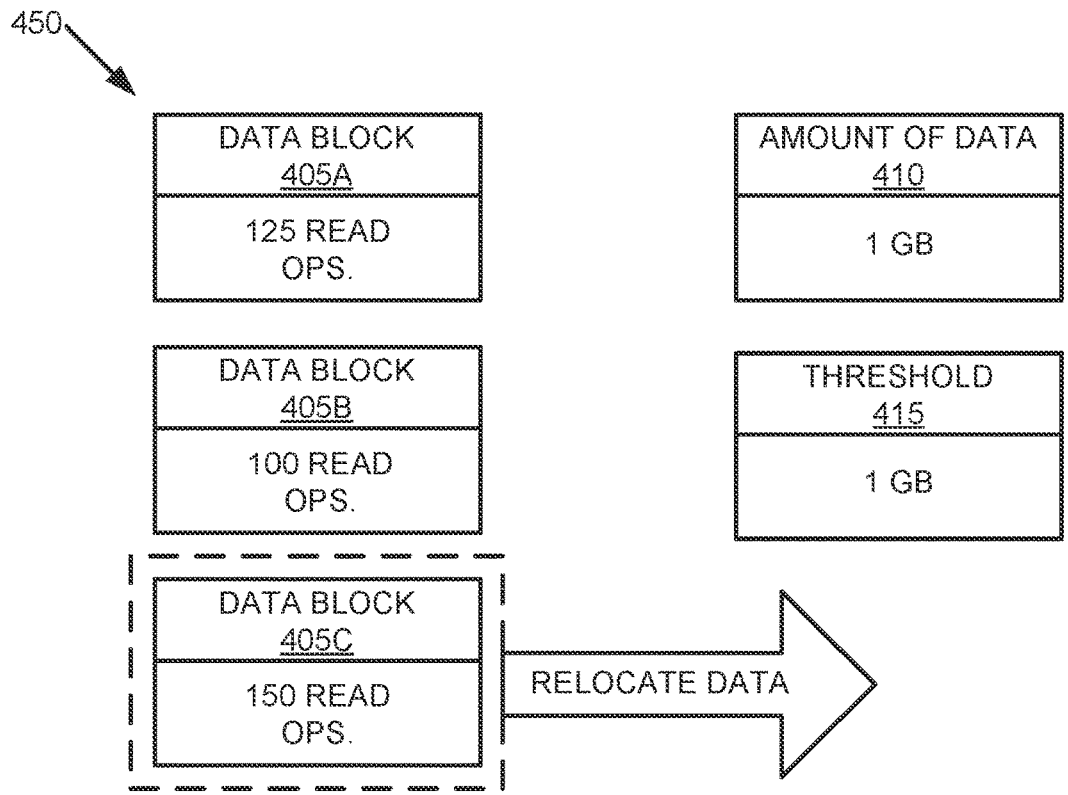
FIG. 4B is an illustration of a memory sub-system identifying a data block for relocation to a low latency portion of a memory component, in accordance with embodiments of the disclosure.

FIG. 4B is an illustration of a memory sub-system 450 identifying a data block for relocation to a low latency portion of a memory component, in accordance with embodiments of the disclosure. In FIG. 4B, data block 405A has a read count of 125 read operations, data block 405B has a read count of 100 read operations and data block 405C has a read count of 150 read operations. The amount of data 410 written to the memory component is 1 GB. Since the amount of data 410 written to the memory component satisfies the first threshold condition (e.g., meets or exceeds the data threshold 415), the memory sub-system 450 identifies a data block for relocation to the low latency portion of the memory component. The memory sub-system 450 can identify data block 405C for relocation based on data block 405C having the highest read count of data blocks 405A, 405B and 405C.

FIG. 5A is an illustration of a memory sub-system 500 determining to relocate subsequent data based on a number of programming operations performed on a memory component, in accordance with some embodiments of the disclosure. As previously discussed, memory cells of a memory component have a finite number of programming operations that can be performed on a memory cell before a memory cell can no longer reliably store data. In some embodiments, the memory sub-system 500 can determine whether to relocate subsequent data to the low latency portion of the memory component based on whether the number of programming operations performed on memory component 505 meets or exceeds an anticipated value 510.

Referring to FIG. 5A, the anticipated value 510 is 1500 programming operations and 1000 programming operations have been performed on memory component 505. Since the number of programming operations performed on memory component 505 does not satisfy a second threshold condition (e.g., does not exceed the anticipated value 510), at block 515 the memory sub-system 500 determines to relocate subsequent data to the low latency portion of memory component 505. The subsequent data can correspond to other frequently read data that is subsequently identified by the memory sub-system 500 for relocation to the low latency portion of memory component 505.

FIG. 5B is an illustration of a memory sub-system 550 determining to relocate subsequent data based on a number of programming operations performed on a memory component, in accordance with some embodiments of the disclosure. In FIG. 5B, the number of programming operations performed on the memory component is 1500 programming operations. Since the number of programming operations performed on memory component 505 satisfies the second threshold condition (e.g., meets or exceeds the anticipated value 510), at block 520 the memory sub-system 550 determines to not relocate subsequent data to the low latency portion of the memory component.

FIG. 6 illustrates a memory sub-system 600 identifying a word line for relocation based on an error rate exceeding a threshold, in accordance with an embodiment of the disclosure. Memory sub-system 600 includes a memory component having word lines 610A-E in a first portion of the memory component. Each of word lines 610A-E has a corresponding error rate 615. Memory sub-system 600 also includes an error rate threshold 620 that corresponds to a difference between the highest error rate for a word line and the next highest error rate for a word line.

As previously discussed, a word line that is frequently read from can cause read disturb stress on other word lines that are proximate to the word line. The read disturb stress on proximate word lines can result in an elevated error rate for the proximate word lines in comparison to other word lines of the memory component. Therefore, a word line that is located between (e.g., is proximate to) two word lines having an elevated error rate can be more frequently read from than other word lines of the memory component and can be identified for relocation to a low latency portion of the memory component.

Referring to FIG. 6, word line 610A has an error rate of 50, word line 610B has an error rate of 500, word line 610C has an error rate of 100, word line 610D has an error rate of 500 and word line 610E has an error rate of 50. Since the difference between the highest error rates (e.g., the error rates for word lines 610B and 610D) and the next highest error rate (e.g., the error rate for word line 610C) satisfies a third threshold condition (e.g., meets or exceeds the error rate threshold 620), memory sub-system 600 can determine that a word line is to be identified for relocation to a low latency portion of the memory component. Memory sub-system 600 identifies a word line that is proximate to word line 610B and word line 610D. Since word line 610C is proximate to both word line 610B and word line 610D, memory sub-system 600 can identify word line 610C. Upon identifying word line 610C, the memory sub-system 600 can relocate data stored at word line 610C to a low latency portion of the memory component.

Figure 7:
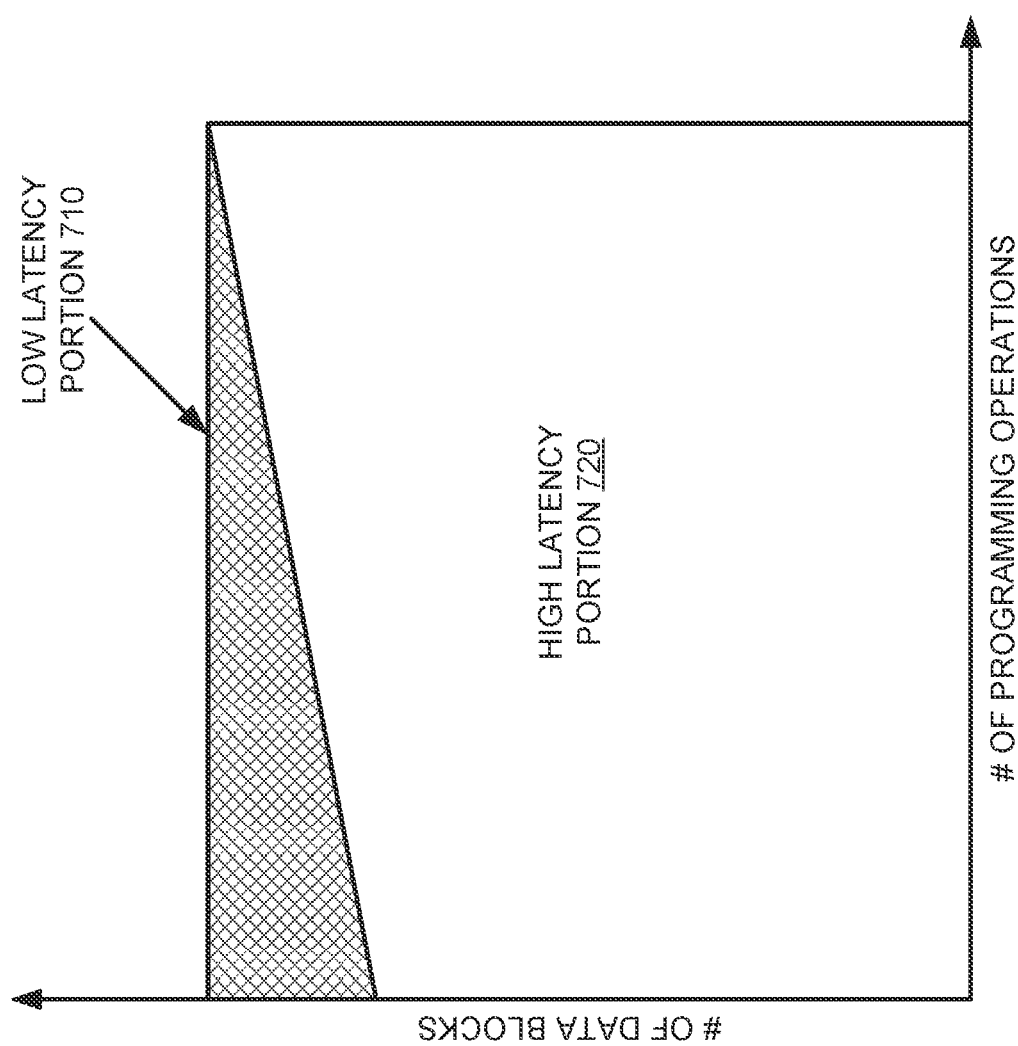
FIG. 7 is a graph illustrating a memory sub-system decreasing the number of data blocks assigned to a low latency portion of a memory component, in accordance with embodiments of the disclosure.

FIG. 7 is a graph 700 illustrating a memory sub-system decreasing the number of data blocks assigned to a low latency portion of a memory component, in accordance with embodiments of the disclosure. The graph 700 includes a Y-axis that is representative of a number of data blocks of a memory component and an X-axis that is representative of a number of programming operations performed on the memory component. The graph 700 further includes a low latency portion 710 that is representative of a number of data blocks assigned to the low latency portion 710 and a high latency portion 720 that is representative of a number of data blocks assigned to the high latency portion 720. The low latency portion 710 and the high latency portion 720 can correspond to the second portion and first portion of FIGS. 2 and 3, respectively.

As previously discussed, as the number of programming operations performed on a memory component increases, the frequency that data is relocated to the low latency portion 710 can be decreased such that data is relocated to the low latency portion 710 less often. Since data is being relocated to the low latency portion 710 less often, as the number of programming cycles performed on the memory component increases, data blocks that are assigned to the low latency portion 710 can be reassigned to the high latency portion 720. In embodiments, upon reassigning a data block to the high latency portion 720, the data block can be programmed as a QLC rather than an SLC.

Figure 8:
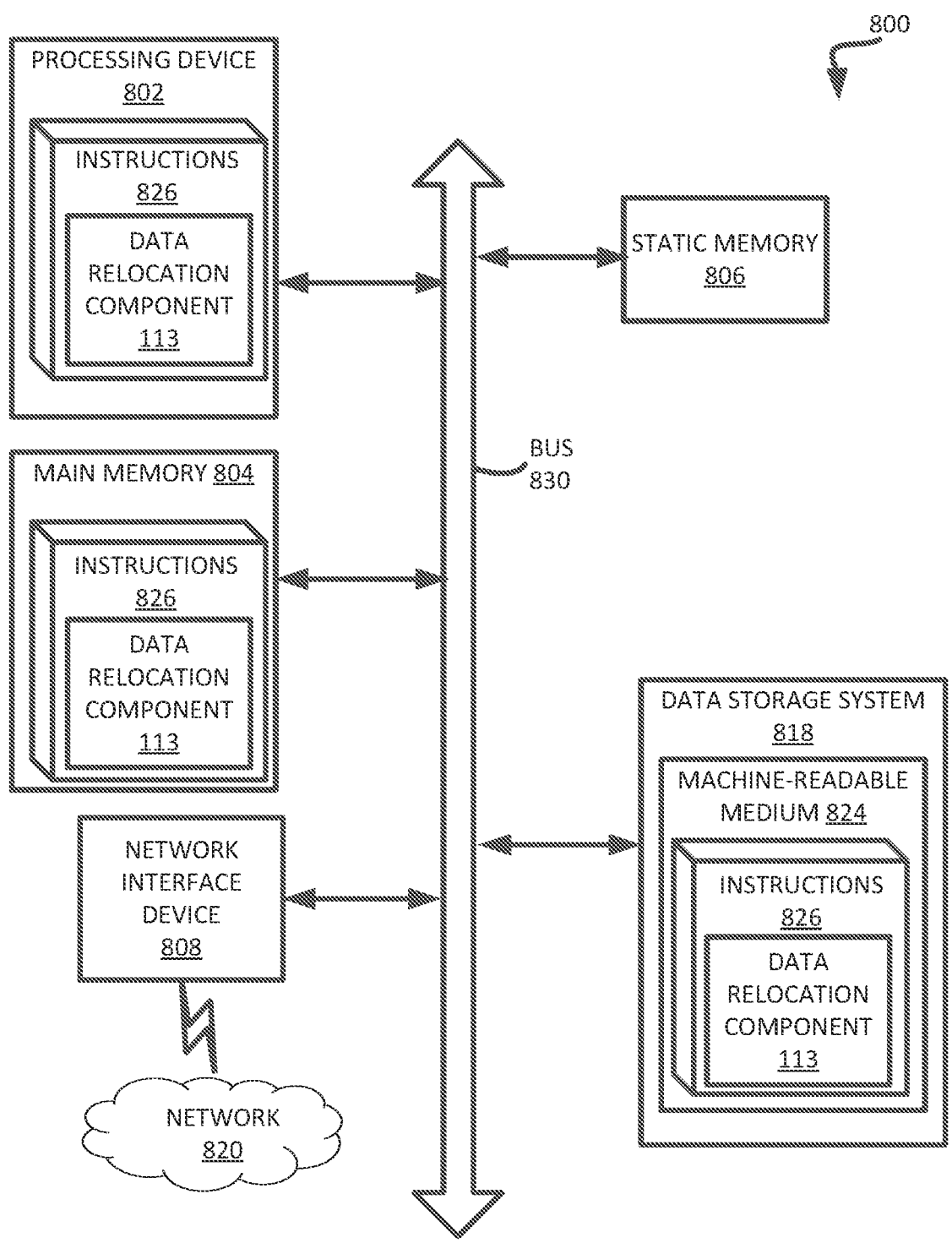
FIG. 8 is a block diagram of an example computer system in which implementations of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data relocation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a data relocation component (e.g., the data relocation component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   identifying a plurality of word lines at a first portion of a memory device;
   determining a respective error rate for each of the plurality of word lines;
   determining that both a first error rate of a first word line of the plurality of word lines and a second error rate of a second word line of the plurality of word lines concurrently satisfy a first threshold condition pertaining to an error rate threshold;
   responsive to determining that both the first error rate of the first word line of the plurality of word lines and the second error rate of the second word line of the plurality of word lines concurrently satisfy the first threshold condition pertaining to the error rate threshold, identifying a third word line of the plurality of word lines that is adjacent to the first word line and the second word line; and
   relocating, by a processing device, data stored at the third word line to a second portion of the memory device, wherein the second portion of the memory device is associated with a lower read latency than the first portion of the memory device.

2. The method of claim 1, wherein the first error rate of the first word line and the second error rate of the second word line satisfying the first threshold condition is indicative of read disturb stress associated with read operations performed on the third word line.

3. The method of claim 1, wherein the first threshold condition is based on a deviation of the first error rate and the second error rate with respect to a representative error rate for the plurality of word lines.

4. The method of claim 1, further comprising:
   determining whether a number of programming operations performed on the memory device satisfies a second threshold condition; and
   in response to determining that the number of programming operations performed on the memory device satisfies the second threshold condition, decreasing the error rate threshold.

5. The method of claim 1, further comprising:
   determining whether a number of programming operations performed on the memory device satisfies a third threshold condition; and
   in response to determining that the number of programming operations performed on the memory device satisfies the third threshold condition, determining to not relocate subsequent data.

6. The method of claim 1, wherein the first portion of the memory device comprises one or more quad-level cells (QLCs) and the second portion of the memory device comprises one or more single-level cell (SLCs).

7. The method of claim 1, wherein the memory device comprises a negative-and (NAND) type flash memory.

8. A system comprising:
   a memory device; and
   a processing device coupled with the memory device, to perform operations comprising:
      identifying a plurality of word lines at a first portion of the memory device;
      determining a respective error rate for each of the plurality of word lines;
      determining that both a first error rate of a first word line of the plurality of word lines and a second error rate of a second word line of the plurality of word lines concurrently satisfy a first threshold condition pertaining to an error rate threshold;
      responsive to determining that both the first error rate of the first word line of the plurality of word lines and the second error rate of the second word line of the plurality of word lines concurrently satisfy the first threshold condition pertaining to the error rate threshold, identifying a third word line of the plurality of word lines that is adjacent to the first word line and the second word line; and
      relocating data stored at the third word line to a second portion of the memory device, wherein the second portion of the memory device is associated with a lower read latency than the first portion of the memory device.

9. The system of claim 8, wherein the first error rate of the first word line and the second error rate of the second word line satisfying the first threshold condition is indicative of read disturb stress associated with read operations performed on the third word line.

10. The system of claim 8, wherein the first threshold condition is based on a deviation of the first error rate and the second error rate with respect to a representative error rate for the plurality of word lines.

11. The system of claim 8, wherein the processing device is to perform operations further comprising:
   determining whether a number of programming operations performed on the memory device satisfies a second threshold condition; and
   in response to determining that the number of programming operations performed on the memory device satisfies the second threshold condition, decreasing the error rate threshold.

12. The system of claim 8, wherein the processing device is to perform operations further comprising:
- determining whether a number of programming operations performed on the memory device satisfies a third threshold condition; and
- in response to determining that the number of programming operations performed on the memory device satisfies the third threshold condition, determining to not relocate subsequent data.

13. The system of claim 8, wherein the first portion of the memory device comprises one or more quad-level cells (QLCs) and the second portion of the memory device comprises one or more single-level cell (SLCs).

14. The system of claim 8, wherein the memory device comprises a negative-and (NAND) type flash memory.

15. A non-transitory computer-readable storage medium comprising instructions that, when executed by a processing device, cause the processing device to perform operations comprising:
- identifying a plurality of word lines at a first portion of a memory device;
- determining a respective error rate for each of the plurality of word lines;
- determining that both a first error rate of a first word line of the plurality of word lines and a second error rate of a second word line of the plurality of word lines concurrently satisfy a first threshold condition pertaining to an error rate threshold;
- responsive to determining that both the first error rate of the first word line of the plurality of word lines and the second error rate of the second word line of the plurality of word lines concurrently satisfy the first threshold condition pertaining to the error rate threshold, identifying a third word line of the plurality of word lines that is adjacent to the first word line and the second word line; and
- relocating data stored at the third word line to a second portion of the memory device, wherein the second portion of the memory device is associated with a lower read latency than the first portion of the memory device.

16. The non-transitory computer-readable storage medium of claim 15, wherein the first error rate of the first word line and the second error rate of the second word line satisfying the first threshold condition is indicative of read disturb stress associated with read operations performed on the third word line.

17. The non-transitory computer-readable storage medium of claim 15, wherein the first threshold condition is based on a deviation of the first error rate and the second error rate with respect to a representative error rate for the plurality of word lines.

18. The non-transitory computer-readable storage medium of claim 15, wherein the instructions cause the processing device to perform operations further comprising:
- determining whether a number of programming operations performed on the memory device satisfies a second threshold condition; and
- in response to determining that the number of programming operations performed on the memory device satisfies the second threshold condition, decreasing the error rate threshold.

19. The non-transitory computer-readable storage medium of claim 15, wherein the instructions cause the processing device to perform operations further comprising:
- determining whether a number of programming operations performed on the memory device satisfies a third threshold condition; and
- in response to determining that the number of programming operations performed on the memory device satisfies the third threshold condition, determining to not relocate subsequent data.

20. The non-transitory computer-readable storage medium of claim 15, wherein the first portion of the memory device comprises one or more quad-level cells (QLCs) and the second portion of the memory device comprises one or more single-level cell (SLCs).

* * * * *